Aug. 13, 1940.  J. W. MYERS ET AL  2,210,947
CONTROL SYSTEM FOR ELECTRICAL RANGE UNITS AND THE LIKE
Filed Feb. 21, 1938  4 Sheets-Sheet 1

Inventors:-
Joseph W. Myers
Stephen J. Roesch
by their Attorneys
Howson & Howson

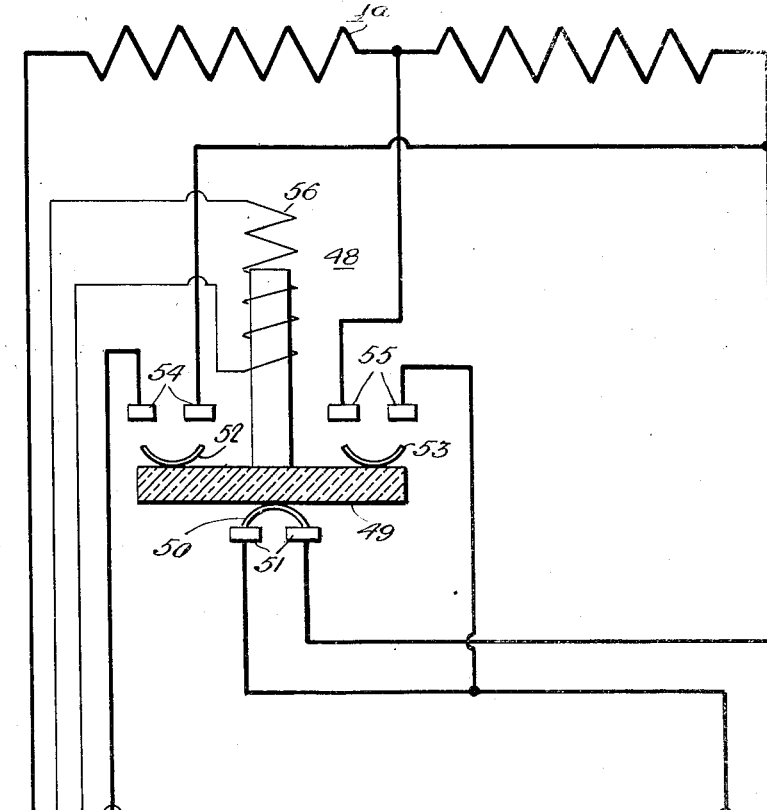
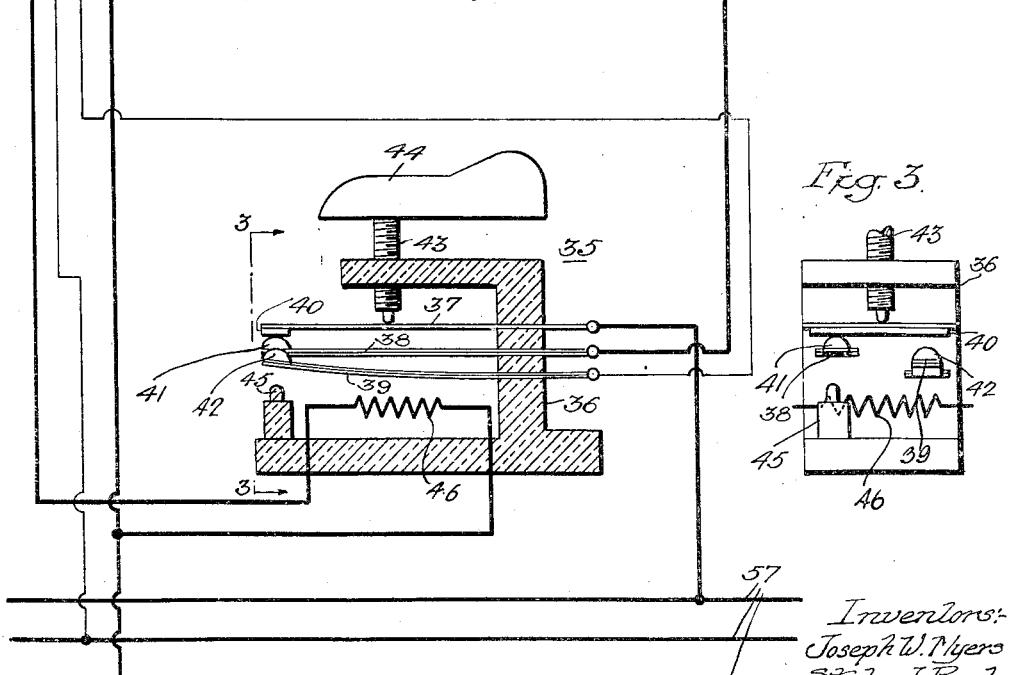
Fig. 2.
Fig. 3.

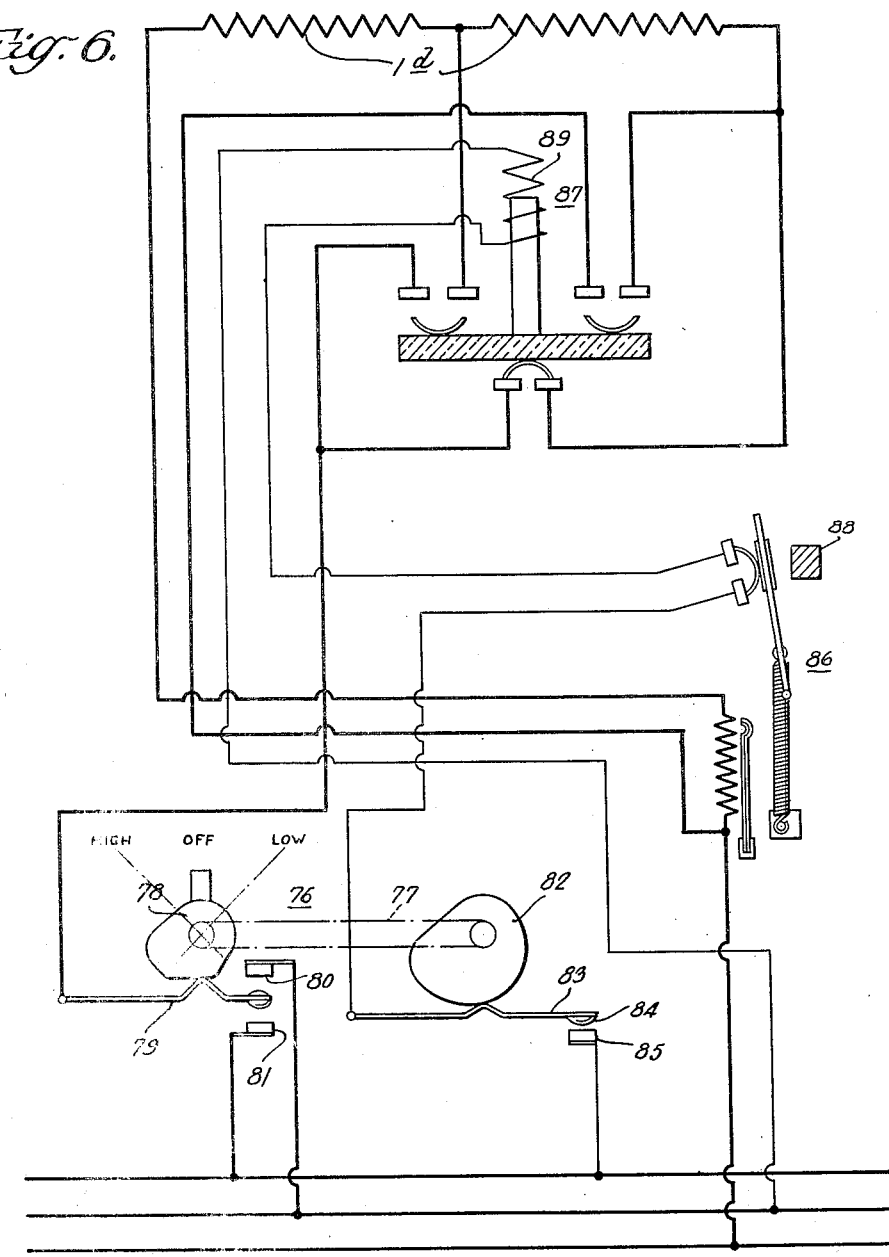

Patented Aug. 13, 1940

2,210,947

UNITED STATES PATENT OFFICE 2,210,947

CONTROL SYSTEM FOR ELECTRICAL RANGE UNITS AND THE LIKE

Joseph W. Myers and Stephen J. Roesch, Philadelphia, Pa., assignors to Proctor & Schwartz, Incorporated, Philadelphia, Pa., a corporation of Pennsylvania Application February 21, 1938, Serial No. 191,816

18 Claims. (Cl. 219—20)

This invention relates to electric range cooking units and the like, and more particularly to novel control means for effecting rapid heating of such units to a desired temperature level and for imparting to such units a high degree of flexibility of control and operation.

The use of electric ranges and other electrical devices employing surface cooking units or plates has been limited or retarded in the past by the fact that such devices require appreciable time to attain their normal operating temperature and heat output at whatever level has been selected and in this respect are not comparable in operation to gas ranges. It is well known that electric ranges have certain definite advantages over the gas ranges, but such advantages have heretofore been generally outweighed by the inherent inability of electric range units to rise rapidly to the several selectable operating temperatures. Moreover, electrical devices of this type which heretofore have been proposed or used have not had the high degree of flexibility of operation that obtains in the gas range, and this is a further reason why gas ranges have been frequently employed in the past in preference to electric ranges.

It has been proposed heretofore to temporarily overload or increase the energization of an electrical surface cooking plate unit by temporarily lowering the resistance of the unit to the supply voltage, and it has been proposed to employ a thermostat directly associated with the plate so as to be effected by the temperature thereof and arranged to restore the resistance of the heating unit to its normal value when the device has arrived at its normal operating temperature. It has also been proposed to decrease the resistance of the heating unit either by providing a normally short-circuited portion of the unit which is rendered effective by the thermostat when the unit has reached its normal operating temperature, or by providing a multi-section heating unit and initially connecting the sections in parallel relation and arranging the thermostat to connect them in series relation when the unit has reached its normal operating temperature. While these proposals have been improvements over the ordinary range unit, they have fallen short of providing a practical and commercially satisfactory range unit or surface cooking plate.

Experimentation has shown clearly that it is difficult in practice to locate a sufficiently sensitive and rugged thermostat against the lower side of the heating unit and, at the same time, have it accessible for servicing and inspection and properly protected from inevitable spillage of food substances. Moreover, to be entirely satisfactory, an electrical range unit or surface cooking plate must have multiple heats for various levels of energy output, and it should be possible to bring the heating unit rapidly to a selected operating temperature and heat output not only from the cold condition, but also from any of the lower operating levels.

The principal object of the present invention is to provide a novel control system for an electric range unit and the like by means of which the unit may be operated at any selected one of a plurality of temperature levels and the unit is automatically flashed (heated rapidly) to any selected temperature level from a lower temperature level.

Another object of the invention is to provide a novel control system of this character employing means for varying the energy input level to effect operation of the heating unit at any selected one of a plurality of temperature or heat output levels, and means for automatically flashing the unit to any selected level.

A further object of the invention is to provide a novel control system of this class employing an adjustable thermostat for controlling the operating temperature level of the heating unit, and wherein the heating unit is automatically flashed to any selected temperature level.

Still another object of the invention is to provide a system of this character employing a thermostatic control device having a plurality of heaters which are constructed and arranged to control the rapid heating of the heating unit to different temperature levels.

A still further object of the invention is to provide a system of this type employing a novel thermostatically controlled flashing mechanism which may be located remote from the heating unit where it will be protected from spillage of food substances and will be readily accessible for servicing, and which functions to protect the unit from damage due to excessive currents or overload.

Other objects and features of the invention will appear hereinafter.

In the accompanying drawings:

Fig. 2 is a similar illustration of a modified form of the system;

Fig. 3 is a detail view taken along line 3—3 of Fig. 2;

Fig. 6 illustrates still another form of the invention.

Figure 1:
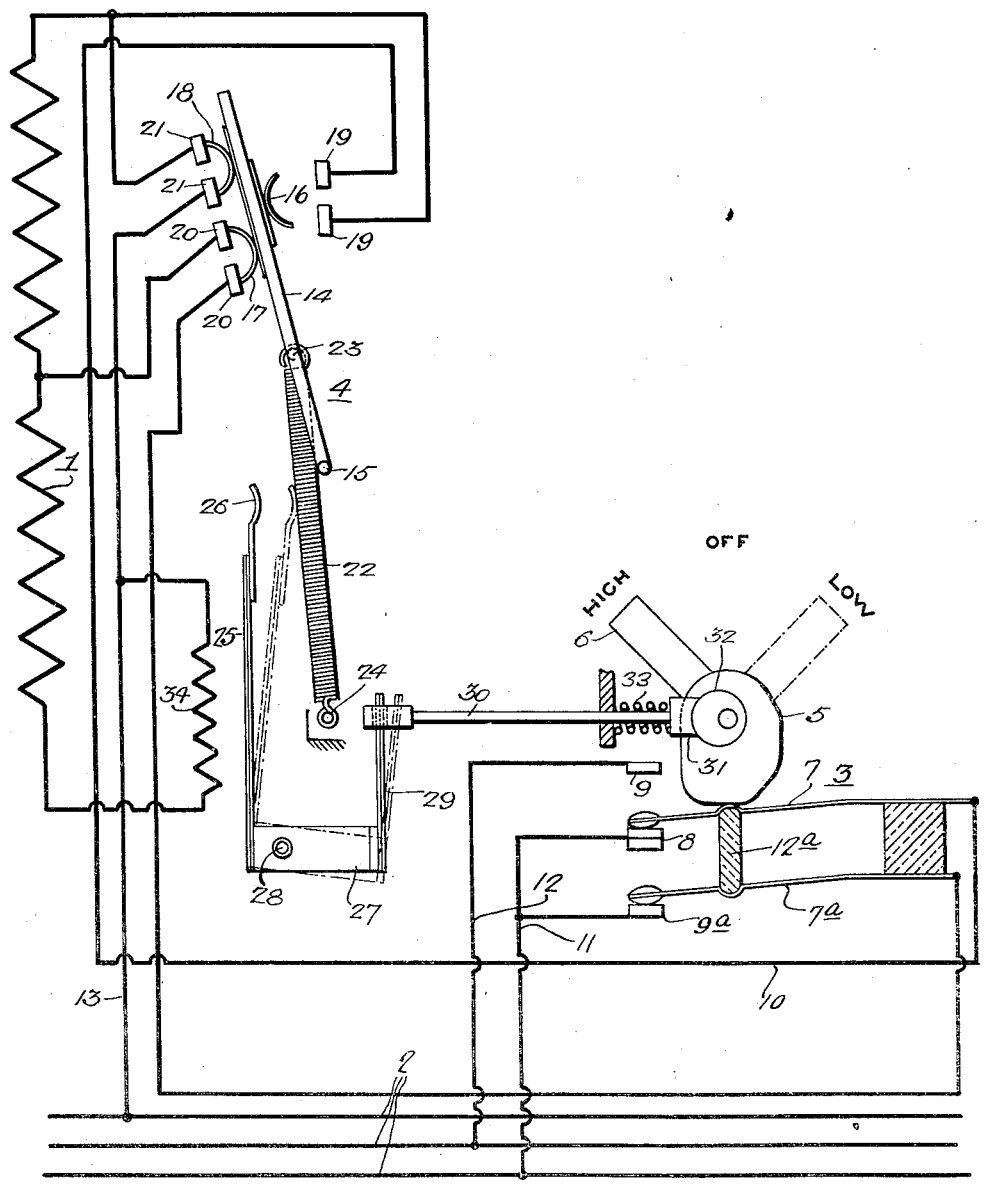
Fig. 1 is a diagrammatic illustration of one form of the control system.

Referring to Fig. 1, there is shown a heating unit 1 comprising a plurality of sections, two sections being employed in the specific device illustrated. The heating unit is energized from a three-wire supply line 2, which supplies different operating voltages, as will be well understood; for example, the voltage across two adjacent conductors of the supply line may be 115 volts, while the voltage across the two outer conductors may be 230 volts. A switch 3 is constructed and arranged to connect the heating unit 1 either across the two uppermost supply conductors or across the two outer supply conductors, to thus apply to the heating unit either of the said voltages to vary the energy input level. The switching mechanism 4, which is cooperatively associated with the switch 3, serves to automatically switch the sections of the heating unit from series relation to parallel relation, and vice versa, to effect flashing of the unit to a selected operating temperature, as will be more clearly understood later.

The switch 3 may, of course, take any desired form and, in the specific device illustrated, it comprises a cam 5 which is movable manually by means of the arm 6 to three positions designated respectively "low," "off," and "high". The cam operates a spring finger or contact arm 7 which is anchored at one end and has its other end free to move between the stationary contacts 8 and 9. When the switch is in the high position shown, the contact arm 7 engages the contact 8 to thus connect the conductor 10 to the lower supply conductor through conductor 11. When the cam is in the "low" position corresponding to the dotted position of the arm 6, the contact finger 7 engages the stationary contact 9, thus connecting conductor 10 to the center supply conductor through the conductor 12. Of course, when the switch 3 is in the "off" position, the contact finger 7 does not engage either of the contacts 8 and 9.

The switch 3 also comprises a movable arm 7a attached to arm 7 by means of the insulating rod 12a and adapted to engage contacts 8 and 9a. The manner in which this portion of the switch operates in tandem with the portion above described will be clearly apparent.

The mechanism 4 comprises an arm 14 which is pivoted at its lower end at 15 and which carries at its upper portion a contact bridge 16 on one side of the arm and contact bridges 17 and 18 on the other side of the arm. The contact bridges are insulated from one another in any suitable manner, for example by constructing arm 14 of insulating material. Stationary contacts 19 are engageable by the bridge 16, while stationary contact 20 and 21 are engageable, respectively, by the contact bridges 17 and 18, as illustrated.

A spring 22 has its upper end connected to arm 14 at 23, while the lower end of the spring is anchored at point 24. It will be noted that the spring continuously urges the arm 14 in a counterclockwise direction about the pivot point 15. Thus, the spring tends to maintain the arm in the position shown or to move it to that position.

A thermostatic element 25, which may comprise a bimetallic strip, is arranged cooperatively with the spring and carries a finger 26 that is adapted to engage the spring, as will be explained more fully later. The lower end of the thermostatic element 25 is attached to a supporting member 27 which is pivoted at 28. A compensating thermostatic element 29 also has its lower end attached to the pivoted member 27, while the upper end of strip 29 is inserted in an opening in an end of rod 30. The opposite end of this rod carries a cam follower 31 which engages and is actuated by an eccentric cam 32 attached to cam 5 or mounted on the same shaft thereon. A spring 33 maintains the follower 31 in engagement with the eccentric cam 32, but permits longitudinal movement of rod 30.

It may now be seen that the eccentric cam 32 actuates the rod 30 whenever the switch 3 is moved, thereby rocking member 27 about its pivot point and positioning the thermostatic element 25 in different positions relative to the spring 22. When the switch 3 is in the "high" position shown, the thermostat 25 is substantially vertical as illustrated, while, when the switch 3 is in the "low" position indicated by the dotted line representation, the thermostatic element 25 is moved to the dotted position close to or against the spring 22. Since the element 25 is adapted to flex toward the spring 22 in response to heat, it will be seen that when the switch 3 is in the "high" position, greater flexing movement of the element 25 is necessary to cause it to deflect spring 22 than the required movement of element 25 when the switch 3 is in the "low" position. The purpose of this will appear presently.

The thermostatic element 25 is actuated by a heater element 34 which is connected in circuit with the heating unit 1 and receives the current supplied to the heating unit, but which may be located remotely with respect to the heating unit. The heat generated by current flowing through the heater element 34 causes the thermostatic element 25 to flex to the right or toward the spring 22, as above noted.

As indicated above, the position of the thermostatic element 25 is also varied by the switch 3, independently of the effect of the heater 34, to vary the distance through which the element 25 is required to move to deflect the spring 22. This adjustment of element 25 by the switch 3 varies the flashing period and causes the heating unit to be flashed to the selected temperature, as will be discussed further hereinafter. The compensating thermostat 29 responds to the ambient temperature of the surrounding air and adjusts the position of the main thermostatic element 25 accordingly. It will be apparent that any flexing of the thermostatic element 29 will vary the position of member 27 slightly, which in turn will vary the position of the element 25. The thermostat 29 is arranged to move in a direction opposite that of the thermostat 25 so as to serve as a compensator. Thus, the element 25 is compensated for differences in the ambient temperatures of the air, thus making the thermostatic control device more accurate. It will be apparent that the element 29 serves a dual function, viz., as a mechanical linkage and also as a compensating thermostat.

Considering the operation of the system as a whole, if the switch 3 is in the "off" position, the heating unit will, of course, be deenergized. Suppose now that it is desired to operate the heating unit at the high temperature level. The switch is accordingly thrown to the "high" position as shown. The arm 14 will be in the position shown under the influence of spring 22. The sections of the heating unit will, therefore, be connected in parallel relation across the high voltage supply conductors. One of the parallel branch circuits includes the lower heating unit section and the heater 34, while the other branch includes the upper heating unit section and the closed contacts 21. The energized circuit also includes closed contacts 20 and closed contacts 8a and 9a. The parallel connection of the heating unit sections overenergizes the heating unit and causes it to heat rapidly. The thermostatic element 25 responds to the heating effect of the heater 34 and engages the spring 22, deflecting the spring and causing it to snap the arm 16 clockwise about its pivot 15, thus opening the contacts 20 and 21 and closing the contacts 19. By virtue of the design of the thermostatic device, as described hereinafter, the switching action of the device 4 takes place when the heating unit has been heated substantially to the "high" temperature level corresponding to the high position of the control switch 3. The switching action by the device 4 connects the heating unit sections in normal series relation through a circuit which may be readily traced and which includes the heater 34, the heating unit sections in series, closed contacts 19, and closed contacts 7 and 8. Thus, the energization of the heating unit is decreased to normal when the desired high temperature level has been reached. The thermostatic element 25 is maintained in its effective position by the continuous heating action of the heater 34, thus maintaining the series connection of the heating unit sections against the action of spring 22. Although the reduced current reduces the heating effect of heater 34, it generates sufficient heat to maintain the element 25 in its effective position.

If the switch 3 should be thrown from its "high" position to its "low" position, thereby applying a lower voltage to the heating unit, the further reduction in current through the heater 34 will cause the thermostatic element 25 to cool somewhat, but this element will still maintain the series connection of the heating unit sections, since it will have been adjusted by the mechanism including rod 30, as above described. The heating unit will, of course, decrease in temperature to the low operating level.

If instead of being thrown from the "high" position to the "low" position, the switch 3 were thrown to the "off" position, the system would, of course, be deenergized and the parts would return to their appropriate positions.

Suppose now that the switch 3 is thrown initially from the "off" position to the "low" position. The heating unit sections are then connected in parallel relation across the two outer supply conductors through closed contacts 7a and 8. As before, the parallel connection of the heating unit sections will cause the heating unit to heat rapidly and, since the thermostatic element 25 is adjusted to the broken-line position corresponding to low operation of the heating unit, the element operates the switching device 4 to connect the heating unit sections in series relation across the two uppermost supply conductors through closed contacts 7 and 9 when the low temperature level has been reached. The element 25 then maintains the series connection of the heating unit sections during the operation of the heating unit at the low temperature level.

If the switch 3 should be thrown from its "low" position to its "high" position, the thermostatic element 25 will be moved away from the spring 22, permitting the switch 4 to move to its flash position, thereby connecting the heating unit sections in parallel across the high voltage conductors to cause rapid heating of the heating unit to its high temperature level. The thermostatic element 25 will then flex further to actuate the switching device 4 and thus restore the series connection of the heating unit sections when the high temperature level has been reached.

It will be seen from the above description that the throwing of the control switch 3 to either of its effective positions causes automatic flashing of the heating unit to bring the heating unit rapidly to the temperature level corresponding to the particular position of the control switch. Moreover, it will be seen that the control switch may be moved from either of its operative positions to its other operative position and the temperature level of the heating unit will be raised or lowered accordingly, and, furthermore, when the control switch is moved from its "low" position directly to its "high" position, the heating unit is automatically overenergized or flashed to bring it rapidly to the high temperature level. It will be apparent also that the thermostatic element 25 will not permit overenergization of the heating unit for a longer period than is necessary to raise the temperature of the unit to that desired. For example, if the heating unit has been previously heated, the thermostatic element 25 will be positioned accordingly and will permit overenergization or flashing of the heating unit for a smaller period of time than would be the case of the heating unit were flashed from its cold condition. Thus, the thermostatic control device serves additionally as a protective device which prevents damage to the heating unit by prolonged overenergization thereof.

It has been found that a heating unit may be satisfactorily controlled by means of a device such as that shown and above described, by properly designing the thermostatic device in relation to the energization "history" of the heating unit. To explain this, it will be apparent that for a given amplitude of energizing current, the temperature of the heating unit will vary in relation to the time duration of the current according to the temperature characteristic of the unit. That is to say, if the temperature of the unit is plotted against time, a certain temperature curve will be obtained. Now in accordance with the present invention, the thermostatic device is designed from the energization "history" of the unit so that the thermo-motive element 25 substantially "tracks" with the temperature of the heating unit. The thermo-motive element is not necessarily maintained at the temperature of the heating unit, but the temperature of one is a function of that of the other. For a given current amplitude, the position of element 25 varies in relation to the time duration of the current. At any instant, therefore, the position of the element 25 is determined by the energization history of the heating unit 1 over a significant period immediately preceding. Now the flashing operation is governed by the position of the element 25, or by the amplitude of movement of the said element, in any particular instance, and, therefore, the flashing operation is empirically regulated according to the energization history of the heating unit over a significant period immediately preceding.

The proper design of the thermostatic device necessarily depends upon various factors, such as the mass of the heating unit with which the device is to be used, the thermal mass of the thermostatic element to be employed, and the activity of the element. In any case, the heating unit should have as low a mass as possible, so that it may be heated rapidly during the flashing operation. Generally speaking, heating units of the type employing highly compressed insulating material completely embedding the wires are satisfactory for the purposes of the invention. For example, the well known tubular "Calrod" heating unit, which is commonly employed in electric ranges, is quite satisfactory. Such unit is capable of being flashed to its normal high operating temperature level in thirty seconds.

One form of the thermostatic device which has been found to be satisfactory comprises a bimetallic strip with the heater element wound about or otherwise disposed on the strip and covered with heat-insulating material, such as sheet asbestos. A fairly heavy bimetal strip of substantial mass should preferably be employed in order that it will store the heat and will not cool too rapidly. For example, a strip of bimetal 2 inches long, ¼ inch wide and .040 inch thick has been found to be satisfactory. The heater may be formed of any suitable resistance wire, such as flat ribbon wire, insulated from the bimetal by mica or other suitable electric insulation. For example, a piece of nichrome ribbon ⅛ inch wide, .004 inch thick and of sufficient length to have a resistance of about ⅓ ohm has been found to be satisfactory. Employing a 1200 watt heating unit, this heater consumes about 36 watts during flash to "high" and about 9 watts during normal high operation. A simple method of designing the device is as follows.

Given a heating unit of certain capacity, it is a simple matter to determine the time required to heat it to a certain high temperature when its sections are connected in parallel across the high voltage supply lines. For example, a 1200 watt "Calrod" unit will heat to a temperature of about 1200° F. in about thirty seconds. The thermostatic control device is then constructed employing a sufficient length or sufficient number of turns of wire to cause the device to interrupt the flashing of the unit after a period of thirty seconds. It is a simple matter to vary the length of the heater to accomplish this. The heating unit is reflashed, after partial cooling, and, if the flashing is interrupted at about 1200° F., the thermostatic element is tracking with the heating unit both during heating and cooling. If, however, the reflashing temperature is higher than 1200° F., the bimetal element is cooling more rapidly than the heating unit. Sufficient heat insulation material, such as asbestos, may then be placed about the element, to reduce the reflashing period to give the desired temperature, thus causing the element to track with the heating unit. If desired, heat-reflecting material such as aluminum foil may be used to reduce the cooling rate of the element. For example, successive layers of asbestos paper, asbestos string, and aluminum foil may be used.

If the device of Fig. 1 is constructed as above described to interrupt the "flash to high" in thirty seconds, the "flash to low" will be considerably shorter in duration because of the adjustment of the bimetal strip. The duration of the "flash to low," and consequently the temperature of the heating unit at the end of the flash, will be determined by the mechanical design.

By employing a thermostatic device of the character above described, several important advantages are obtained. The device may be located remotely with respect to the heating unit in any suitable position where it will be protected from grease or spillage from the cooking vessels or pans and where it is conveniently located for servicing and inspection. Moreover, the employment of such thermostatic device in combination with the specific switch employed provides a control device which not only automatically controls the duration of the flashing operation, but also prevents flashing when the heating unit is already at or near its maximum permissible temperature. Thus, the device protects the heating unit from damage due to excessive overheating.

Where the flashing operation is effected by connecting a plurality of heating unit sections in parallel relation and where a single heater element is employed in the thermostatic control device, as in the system of Fig. 1, the location of the heater element in the circuit is important. By arranging the heater element 34 so that it is normally in series with the heating unit and so that it is included in one of the branch circuits during the flashing operation, the wattage consumption of the heater element is caused to vary in the same ratio as the wattage consumption of the heating unit. This enables the thermostatic control device to "keep in step" or "track" with the heating unit temperature.

Thus, assuming that the heating unit comprises two sections of equal resistance, when the sections are connected in parallel relation across a given supply voltage, the resistance of the unit is reduced to one-fourth the normal resistance of the series-connected sections, and hence the total current supplied to the heating unit is four times that normally supplied to the unit. Now if the heater 34 were connected in series with the parallel-connected heating unit sections, the heater would receive four times the normal current, and since the resistance of the heater remains constant and its wattage is proportional to the square of the current, it would consume sixteen times its normal wattage. On the other hand, the heating unit, whose resistance is reduced as stated, consumes only four times its normal wattage. However, since the heater 34 is included in one of the branch circuits of the parallel-connected heating unit sections, it receives only twice the normal current during the flashing operation, and therefore its wattage consumption increases in the same ratio as that of the heating unit.

In Fig. 2, there is shown another form of the control system in which the multi-section heating unit 1a is operated normally at a constant voltage, and in which the energy input to the unit is varied to cause the unit to operate at any desired temperature level by adjustment of a thermostatic switching device 35, which also controls the flashing of the heating unit and enables flashing of the unit to any selected temperature or heat output level. In the specific form shown, the thermostatic switch 35 comprises an insulating support 36 carrying a resilient contact arm 37 and thermostatic elements 38 and 39 which may comprise bimetallic strips. The arrangement of the switch elements may be seen more clearly from Fig. 3. It will be noted that the arm 37 is of substantial width and the contact 40 at the free end of the arm is likewise of substantial width. The bimetallic strips 38 and 39 are spaced horizontally with respect to one another, and the strip 39 is below the strip 38. The contacts 41 and 42 carried at the free ends of strips 38 and 39, respectively, are adapted to engage the contact 40. The thermostatic strip 38 functions to control the energization of the heating unit, while the thermostatic strip 39 controls the flashing of the heating unit. The manner in which these elements operate cooperatively will be explained presently.

The position of arm 37 is adjustable by means of the screw 43 carried by the support 36, the screw being adjustable vertically by means of the control knob or handle 44. The support 36 also carries a stationary stop 45 which is disposed beneath the end of strip 38, as shown in Fig. 3, and limits the downward movement of strip 38. The thermostatic strips are actuated to the same degree by the common heater element 46.

The flashing of the heating unit is effected by an electromagnetic contactor 48, the armature 49 of which carries a contact bridge 50 on one side adapted to engage contacts 51 and contact bridges 52 and 53 on its other side adapted to engage contacts 54 and 55. These contact bridges are insulated from one another, for example by forming the lower part of the armature of insulating material. Normally, the armature is in its lower position shown, with the contacts 51 closed and the contacts 54 and 55 open. When the winding 56 is energized, however, the armature is raised to its upper position, opening contacts 51 and closing contacts 54 and 55. When the armature is in its lower position, as shown, the sections of the heating unit are connected in series relation for normal energization of the heating unit, but when the contactor armature is in its upper position, the heating unit sections are connected in parallel relation, thereby increasing the energization of the heating unit 400% to effect the flashing operation. The energization of winding 56 is controlled by the thermostatic strip 39 which thus controls the flashing of the heating unit, as above indicated.

Considering the operation of this system, it will be noted that the energy input level of the heating unit may be varied to operate the unit at any desired temperature level by adjusting the knob 44. The thermostatic strip 38 flexes downward in response to heat to open the contacts 40 and 41, and, therefore, the operating level of the heating unit may be raised by turning the knob 44 in a direction to lower the screw 43, while the operating level of the heating unit may be lowered by turning the knob in the opposite direction to raise the screw 43. When the screw 43 is lowered, it tends to bend the arm 37 and the bimetallic strip 38 downward and causes greater contact pressure between the contacts 40 and 41, and, therefore, a greater thermal influence on the thermostatic element 38 is required to open the contacts 40 and 41 than is required when the screw 43 is raised. In other words, the vertical position of screw 43 determines the energy input level and the heat output level of the heating unit at which the thermostatic strip 38 is effective to open the contacts 40 and 41. If the screw 43 is raised sufficiently, the contact 40 will leave contact 41, thus opening the energizing circuit. It will be understood, therefore, that the knob 44 will have an "off" position at which the contacts 40 and 41 will be open.

Assuming a given adjustment of the knob 44 to one of its operative positions, the closed contacts 40 and 41 will complete an energizing circuit for the heating unit which may be traced from the uppermost conductor of the supply line 57 through the closed contacts 40 and 41, the closed contacts 51, the heating unit sections in series, and the heater element 46 to the lowermost conductor of the supply line. Except for extremely low temperature levels or slight selected increases which do not require flashing of the heating unit, the adjustment of screw 43 will bring contact 40 into engagement with contact 42, thereby closing an energizing circuit for the contactor 48, which circuit extends from the uppermost supply conductor through the closed contacts 40 and 42, and winding 56 to the intermediate or center supply conductor. Thus, a relatively low voltage, for example 115 volts, is applied to the winding 56 to energize the same. The contactor armature 49 is thus moved to its upper position. It will be noted that this connects the heating unit sections in parallel relation with the heater element 46 in one of the parallel branches, the circuit being readily traceable. Thus, for any temperature level other than extremely low levels, the heating unit is automatically flashed, the flashing operation being initiated by the adjustment of the control thermostat. Due to the lower position of the flash-control thermostat 39, it operates slightly in advance of the temperature control thermostat 38 and opens the energizing circuit for the contactor 48 when the heating unit has been heated substantially to the desired temperature, just prior to the opening of the contacts 40 and 41. The heating unit having been over-energized or flashed to cause rapid heating to the desired temperature determined by the thermostat adjustment, the series connection of the heating unit sections is then restored by the deenergization of the contactor 48. Thereafter, as long as the same adjustment is maintained, the flash-control thermostat 39 is maintained by the heat from the heater element 46 in a position such that the contacts 40 and 42 are open, while the temperature control thermostat 38 functions to maintain the heating unit at the selected temperature level. This operation takes place regardless of the selected temperature level. In other words, any desired temperature level may be selected and the thermostat control may be adjusted accordingly, causing automatic flashing of the heating unit to the selected temperature level and automatic restoration of the normal energization when the selected temperature level is reached. It will be noted further that the thermostatic control is continuously adjustable, giving a wide range of selection, and is not limited to particular positions as is the device of Fig. 1.

Suppose now that after the unit has been raised to a selected temperature level in the manner above described, the thermostat control is again adjusted to lower or raise the operating temperature level. If the screw 43 is adjusted to lower the operating level, the temperature control thermostat 38 will be adjusted accordingly to cause it to operate at the lower selected temperature level. At the same time, the heating effect of the heater 46 will be reduced owing to the decrease in time duration of the currents flowing through it, and the flash thermostat 39 will rise accordingly but not sufficiently to close contacts 40 and 42. Suppose, however, that screw 43 were adjusted to raise the operating temperature level. In addition to adjusting the temperature control thermostat 38 for operation at the higher temperature level, this would close contacts 40 and 42, thus energizing the contactor winding 56 and causing reflashing of the heating unit to the higher temperature level.

Thus, whenever the thermostat control is adjusted for operation at a substantially higher temperature level than that previously obtaining, the flashing operation is automatically initiated to cause rapid heating of the heating unit to the selected higher temperature level. The maximum temperature to which the heating unit may be flashed is determined by the stop 45 which limits the downward movement of the thermostat 38 and, accordingly limits the adjustment of the flash-control thermostat 39 by stopping further downward movement of contact 40. With contacts 40 and 41 in locked engagement, unit 1a is obviously developing its full rated wattage and flashing to a higher temperature is accordingly prohibited. It will be noted also that the flashing period is determined in any instance by the position of the flash-control thermostat 39 and, if the heating unit has been previously heated, the flash-control thermostat will be positioned accordingly and will prevent damage to the heating unit by prolonged over-energization. Thus, the control device functions as a safety device in addition to its primary function.

From the description, it will be apparent that the thermostatic control device may be constructed in a simple manner to cause interruption of the flash to the highest temperature at the end of a predetermined time interval. It will be understood, of course, that the illustrations of Figs. 2 and 3 are diagrammatic. In practice, the thermostatic control device should preferably be housed to prevent too rapid loss of heat. It will be apparent also that the common heater may be mounted adjacent the thermostatic elements.

While it is preferred to employ a heater to actuate the dual thermostatic switch and to locate the latter remote from the heating unit, useful results may obviously be obtained by operating this type of switch under the direct influence of heat generated by the heating unit without employing a separate heater.

Figure 4:
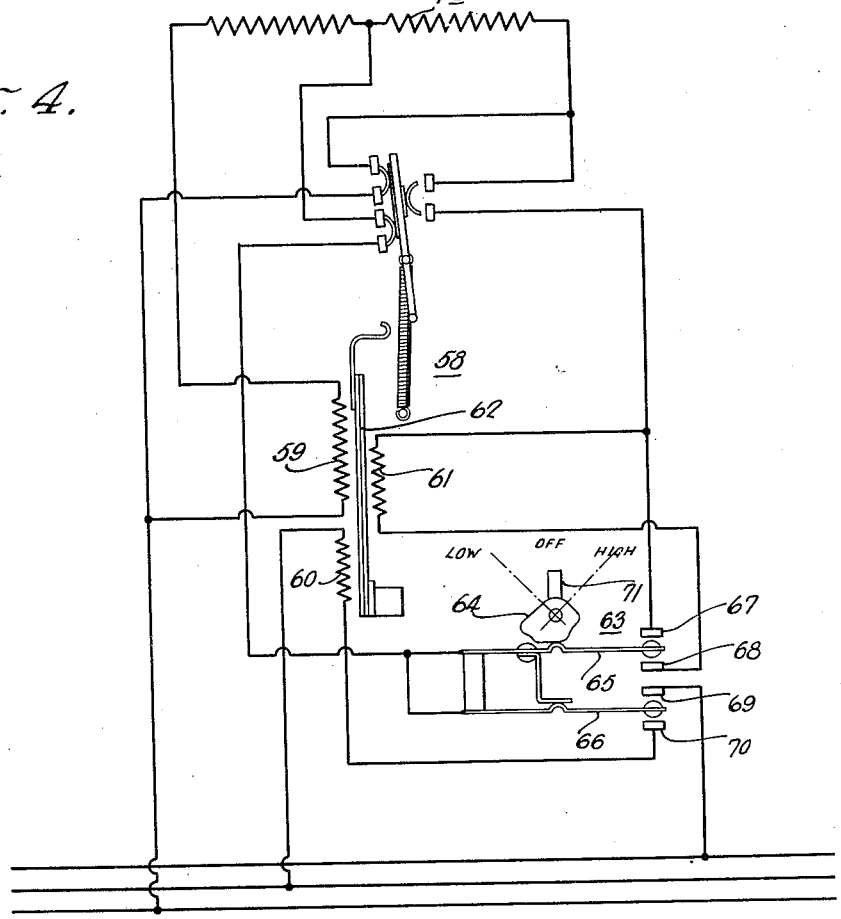
Fig. 4 illustrates another form of control system.

In Fig. 4, there is illustrated a further form of the control system embodying the principles of the invention. In this instance, the thermostatic control switch 58 is generally similar to the corresponding device of Fig. 1 and operates in the same general manner to connect the heating unit sections in parallel relation during flashing and in series relation during normal operation. In this device, however, there are three heater elements 59, 60 and 61 associated with the thermostatic element 62. These heater elements control the flashing of the heating unit to different temperature levels, as will be further described presently. A manual control switch 63 controls the operation of the heating unit at the low and high temperature levels. This switch comprises a cam 64 and contact blades or arms 65 and 66 which are connected together mechanically and electrically. Arm 65 is adapted to engage contacts 67 and 68 selectively, while arm 66 is adapted to engage contacts 69 and 70 selectively. The cam is movable to "off," "low," and "high" positions by the arm 71, as indicated. When the switch is thrown to "low" position, the heating unit is connected across the low voltage supply conductors, and when the switch is thrown to "high" position, the heating unit is connected across the high voltage conductors.

The heating unit may, for example, have a normal consumption of 1200 watts when the sections are connected in series across the high voltage (230 volts) conductors, and a normal consumption of 300 watts when connected across the low voltage (115 volts) conductors. During flash to the high temperature level, the unit will consume 4800 watts since the parallel connection of the sections increases the power consumption four times normal. During flash to the low temperature level, the heating unit will consume 1200 watts. The principal functions of the heater elements are as follows: Heater 59 controls the flash to the high temperature level and also maintains the switch 58 in "normal" position after the flashing operation is completed. Heater 60 controls the flash to the low temperature level, while heater 61 maintains the switch 58 in "normal" position after the flashing operation.

Considering first the "high" operation, when the switch 63 is thrown to "high" position, arm 65 engages contact 67 while arm 66 engages contact 69. During the flash to "high," the heating unit sections are connected in parallel, with the heater 59 in one of the branches, across the high voltage conductors through the closed contacts 66, 69. When the thermostatic element 62 throws switch 58 to "normal" position, under the influence of heater 59, the heating unit sections are connected in series across the high voltage conductors through closed contacts 65, 67 and 66, 69, the heater 59 being included in the series circuit. It will be apparent from the previous description that the wattage consumption of heater 59 varies in the same ratio as that of the heating unit.

When the switch 63 is thrown to "low" position, arm 65 engages contact 68, while arm 66 engages contact 70. During low operation (flash and normal), the heater 59 is included in circuit just as it is during high operation, but it exerts little influence upon the thermostatic element for the following reason. Since this heater is of relatively low resistance to carry the currents during high operation, its heating effect is greatly reduced during low operation since at that time relatively low amplitude currents flow through the low resistance element. It will be noted, however, that heater 60 is included in circuit during flash to the low temperature level, the energizing circuit being completed by closed contacts 66, 70. The heater 60 is of relatively high resistance, compared to heater 59, since it is only required to carry the "low" flash currents. Therefore, during flash to low temperature level, the thermostatic element is affected principally by heater 60.

When the switch 58 is moved to "normal" position by the thermostatic element, the heating unit sections are connected in series to the low voltage conductors through heater 61, closed contacts 65, 68, closed contacts 66, 70, and heater 60. Heater 61 is of high resistance compared to heater 60, since it only carries the low amplitude current during normal low operation. The heating effect of heater 60 is greatly reduced by the reduction in current amplitude, and, therefore, the principal influence upon the thermostatic element to hold the switch 58 in "normal" positions is derived from heater 61. At this time, the heating effect of heater 59 is even less than before, due to the further reduction in current amplitude.

The varying effects of the heaters 59 and 60, as mentioned above, may be seen more clearly when it is considered that the wattage consumption of heater 59 varies in the ratio of sixteen to one from high flash operation to low normal operation, while the wattage consumption of heater 60 varies in the ratio of sixteen to one from low flash operation to low normal operation.

It should be noted that in this instance the heating unit may not be flashed from "low" to "high" directly, but only from cold to either temperature level. A flash from "low" to "high" can only take place after the switch 63 has been moved to "off" position and has remained in such position for a sufficient time to permit cooling of element 62 and the heating unit 1b so that the switch 58 moves to flash position.

The multiple heater control device may be constructed as follows. Having determined the "high" and "low" flash periods, the heater 59 may be constructed as described above to interrupt the "flash to high" at the end of the predetermined period. The heater 60 is then applied and constructed in a similar manner to interrupt the "flash to low" at the end of the predetermined low flash period. The heater 61 is then applied and constructed in the same manner to prevent return of switch 58 to flash position during low normal operation. The device is then reflashed to "high" to determine whether the thermostatic element is tracking with the heating unit. If the reflash period is too long, heat insulation material may be applied, as described above. The sizes of wire for the several heaters will, of course, be selected according to the highest current amplitude which each heater is required to carry.

The heaters may be mounted on the bimetallic strip in any suitable manner. For example, the heaters may be mounted on the bimetal strip in spaced relation, or they may be wound one upon another, electrically insulated from the bimetal and from each other.

Figure 5:
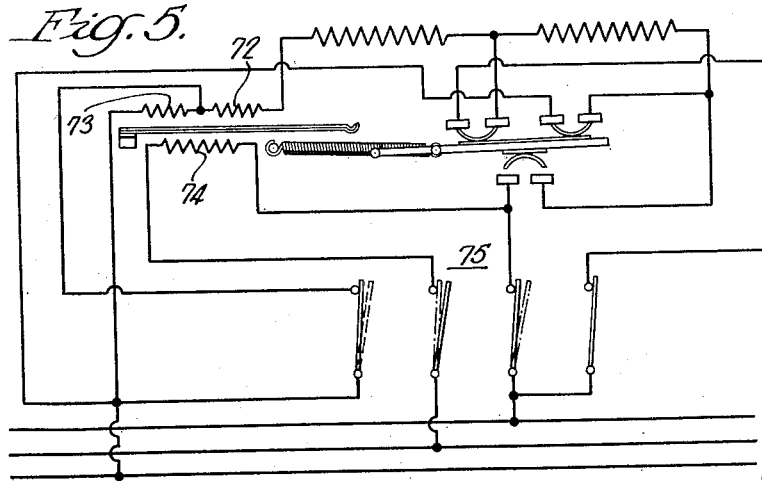
Fig. 5 is a similar illustration of a further modification.

In Fig. 5, there is illustrated a further embodiment employing a multiple heater arrangement comprising heaters 72, 73 and 74. The thermostatic switch is similar to those above described and operates in the same general manner. The manual control switch 75 in this instance comprises four contact arms, which are shown in their "high" positions, the "low" positions of three of the arms being shown in broken line representation. The fourth arm remains in the same position for both "high" and "low" operation. In the "off" position of the switch, all of the arms are open. The arms of the switch may be operated by cams on a common rotatable shaft, as is common practice in the construction of switches comprising a plurality of contact arms.

In the "high" position of the switch, the heater 73 is short-circuited. During "flash to high" operation, the heater 72 is included in one of the parallel branches of the parallel-connected heating unit sections, while during normal high operation, the heater 72 is connected in series with the series-connected heating unit sections, in both instances the high supply voltage being utilized.

During "flash to low" operation, the heaters 72 and 73 are both utilized, thus increasing the resistance of the heater to obtain the desired heating effect. It will be noted that the high supply voltage is utilized to flash the heating unit to the low temperature level. The effect of the increased heater resistance is to require less time for "flash to low" than "flash to high." During normal low operation, the relatively high resistance heater 74 is also included in circuit, thus further increasing the total heater resistance to obtain the desired heating effect from the low amplitude current resulting from the decrease in supply voltage.

In this instance also the heating unit may not be flashed directly from "low" to "high" for the reason stated above in connection with Fig. 4.

The control device employed in this instance may be constructed in the manner indicated above.

Thus, it will be seen that in the devices of Figs. 4 and 5, the flashing of the heating unit to different temperature levels is effected by means of a plurality of heater elements on the thermostatic control device employed in combination with a manual control switch for selecting the different levels.

Referring now to Fig. 6, there is illustrated a further form of the control system in which the multi-section heating unit 1d may be operated at low and high temperature levels by the application of different operating voltages, but in which the heating unit is automatically flashed to the high level only. In this instance, the control device 76 serves to connect the heating unit 1d either across the two lower adjacent supply lines or across the two outer supply lines, to thus apply a low voltage or a high voltage to the heating unit. The control device 76 comprises a rotatable shaft 77 carrying a cam 78 which actuates a movable contact 79 that is adapted to engage either of the contacts 80 and 81. The shaft 77 also carries a cam 82 which operates a switch arm 83 on which there is provided a contact 84 adapted to engage the stationary contact 85. The switch elements 79, 80 and 81 effect the different connections of the heating unit 1d to the supply line, as above mentioned. The switch contacts 84 and 85, together with the thermostatic switch 86 control the energizing circuit of the flash contactor 87. The switch 86 is similar to the corresponding devices of Figs. 1, 4 and 5, but in this instance the pivoted arm is moved by the thermostatic element against a stop 88 which maintains the arm under the influence of the counterclockwise force of the spring. The contactor 87 is similar to that of Fig. 2.

Considering the operation of this system, in the "off" position of the control switch 76, the elements will be disposed as illustrated. Suppose that the shaft 77 is rotated so as to rotate the cams 78 and 82 clockwise to effect operation of the heating unit at its low temperature level. It will be seen that the spring contact finger 79 will be permitted to rise and engage contact 80, thus connecting the heating unit across the two lower supply lines so that the low operating voltage is applied to the series-connected sections of the heating unit. Suppose now that it is desired to operate the heating unit at its high temperature level. The shaft 77 will then be rotated in a manner to move the cams 78 and 82 counterclockwise. As the high portion of cam 82 engages the arm 83, the contacts 84 and 85 are closed, thus energizing the winding 89 and causing the flash contactor to open its lower contacts and close its upper contacts. At the same time, the cam 78 causes the arm 79 to engage contact 81. It will be seen that the sections of the heating unit are now connected in parallel relation across the two outer supply lines. When the switch 86 opens under the influence of its associated thermostat, the energizing circuit for the winding 89 is interrupted, causing contactor 87 to open its upper contacts and engage its lower contacts. The sections of the heating units are then connected in series relation between the two outer supply lines for normal high operation.

From the various disclosed embodiment and the above description, it will be apparent that the invention provides a novel control system for electric range units or the like by means of which a heating unit may be operated at any one of a plurality of energy input levels or temperature levels, and the unit may be flashed or over-energized to bring it quickly to any selected temperature level provided that the instant temperature of the heating unit is lower than that selected, except as limited in the disclosures of Figs. 4 and 5. In addition to this essential feature of the invention, the control system embodies various other desirable and advantageous features as above pointed out. By means of this system, a heating unit may be operated and controlled with great ease and flexibility and, at the same time, the heating unit is protected against injury from over-energization. The control system thus eliminates all of the disadvantages of prior electric range units compared to gas ranges, and, at the same time, embodies further advantages which do not obtain in gas ranges and other prior devices.

While certain specific embodiments of the control system have been disclosed and described for the purpose of illustration, it will be understood that the invention is not limited to these forms, but is capable of various other forms and modifications without departing from its scope.

We claim:

1. In an electrical heating device, an electric heating unit, means for energizing said unit, means including a multi-position control device for operating said unit at any one of a plurality of selected energy input levels, corresponding respectively to selectable operating temperatures of the unit, means for automatically increasing the energization of said unit to above normal whenever said control device is adjusted to substantially raise the operating temperature level of the unit, whereby said unit is caused to heat rapidly, and means variously operable by said control device for restoring the normal energization of said unit when the unit reaches the selected temperature level, corresponding to the selected energy input level.

2. In an electrical heating device, an electric heating unit comprising a plurality of sections, means for connecting the sections of said unit in series relation to effect normal operation of the unit, means including a multi-position control device for operating said unit at any one of a plurality of selected energy input levels, corresponding respectively to selectable operating temperatures of the unit, means for automatically connecting the sections of said unit in parallel relation to increase the energization of said unit to above normal whenever said control device is adjusted to substantially raise the operating temperature level of the unit, to thereby cause said unit to heat rapidly, and means for restoring the series connection of said sections to restore the normal energization of said unit when the unit reaches the selected temperature level, corresponding respectively to selected energy input level.

3. In an electrical heating device, an electric heating unit, manually adjustable means for operating said unit at any one of a plurality of selectable operating temperatures, means for automatically increasing the energization of said unit to above normal in response to adjustment of said manual means to substantially raise the operating temperature level of the unit, whereby said unit is caused to heat rapidly, and means variously conditioned by said manual means for restoring the normal energization of said unit when the unit reaches the selected temperature level.

4. In an electrical heating device, an electric heating unit, manually adjustable means for operating said unit at any one of a plurality of selected energy input levels corresponding respectively to selectable operating temperatures of the unit, means responsive to temperature-increasing adjustment of said manual means for increasing the energization of said unit to above normal, whereby said unit is caused to heat rapidly, and means variously conditioned by said manual means for restoring the normal energization of said unit when the unit reaches the selected temperature level corresponding to the selected energy input level.

5. In an electrical heating device, an electric heating unit, manually adjustable means for operating said unit at any one of a plurality of selected energy input levels corresponding respectively to selectable operating temperatures of the unit, means for automatically increasing the energization of said unit to above normal in response to adjustment of said manual means to substantially raise the operating temperature level of the unit, whereby said unit is caused to heat rapidly, and means variously conditioned by said manual means for restoring the normal energization of said unit when the unit reaches the selected temperature level corresponding to the selected energy input level, and for preventing increase of the energization of the unit to above normal whenever the unit is already heated substantially to the selected temperature level.

6. In an electrical heating apparatus an electric heating unit, means for energizing said unit, means including a multi-position control device for operating said unit at different temperature levels, means for automatically increasing the energization of said unit to above normal in response to adjustment of said control device to substantially raise the operating temperature level of the unit, to cause the unit to heat rapidly, said last-named means including a movable element normally maintained in a position effective to increase the energization of the unit, a thermomotive element arranged to move and maintain said first-mentioned element away from said position, to thus effect and maintain normal energization of said unit, and means variously conditioned by said control device for actuating said thermomotive element according to the selected temperature level of said unit.

7. In an electrical heating apparatus, an electrical heating unit, means for operating said unit at any one of a plurality of selectable operating temperatures, means for increasing the energization of said unit to above normal, to cause said unit to heat rapidly, and thermostatic control means including a thermomotive device for restoring the normal energization of said unit when the unit reaches the temperature selected by said first means, said thermomotive device comprising a heater element of low energy-consuming capacity compared to said unit and continuously in circuit with the unit, and an associated thermomotive element responsive to the heat from said element, said thermomotive device being constructed and arranged to heat and cool proportionately to the heating and cooling of said unit, to thus control the abnormal energization of said unit according to the energization history of the heating unit.

8. In an electrical heating device, an electric heating unit, means for energizing said unit, means including a multi-position control device for operating said unit at any one of a plurality of temperature levels corresponding to the positions of said control device, said temperature levels including a normal high operating level, means including a current-operated thermomotive device responsive to the adjustment of said control device to its high position only for increasing the energization of said unit to above normal, to thereby heat the unit rapidly to said high temperature level from a lower temperature level, and means for conditioning said thermomotive device according to the temperature of said unit when said control device is adjusted to a lower position to operate the unit at a lower temperature level.

9. In an electrical device, an electric heating unit, means for energizing said unit, means including a multi-position control device for operating said unit at any one of a plurality of temperature levels corresponding to the positions of said control device, said temperature levels including a normal high operating level and at least one lower level, means operable when said control device is adjusted to its high position for increasing the energization of said unit to above normal, to thereby heat the unit rapidly to said high temperature level, said last means including a current-operated thermomotive device remote from said unit and continuously in circuit with said unit, and means operable in response to adjustment of said control device to a lower position for conditioning said energy-increasing means so as to prevent the rapid heating of the unit to said high temperature level.

10. In an electrical heating device, an electric heating unit, means for energizing said unit, means including an adjustable switch for operating said unit at any one of a plurality of temperature levels, means for automatically increasing the energization of said unit to above normal in response to adjustment of said switch to substantially raise the operating temperature level of the unit, to cause the unit to heat rapidly to a selected temperature level determined by the adjustment of said switch, and a thermostatic element mechanically connected to said switch so as to be movably adjustable thereby, and arranged to actuate said last means to effect normal energization of said unit when the unit reaches the selected temperature level.

11. In an electrical heating device, an electric heating unit, means for energizing said unit, means including an adjustable switch for operating said unit at any one of a plurality of temperature levels, means including a contactor biased to a certain position for automatically increasing the energization of said unit to above normal in response to adjustment of switch to substantially raise the operating temperature level of a unit, to cause the unit to heat rapidly to a selected temperature level determined by the adjustment of said switch, and a thermostatic element mechanically connected to said switch so as to be movably adjustable thereby, and arranged to actuate said contactor to effect normal energization of said unit when the unit reaches the selected temperature level.

12. In an electrical heating device, an electric heating unit, means for energizing said unit, means including an adjustable thermostat for operating said unit at any one of a plurality of selectable operating temperatures, means for automatically increasing the energization of said unit to above normal in response to adjustment of said thermostat to substantially raise the operating temperature level of the unit, to cause said unit to heat rapidly to a selected temperature level determined by the adjustment of said thermostat, and means for restoring the normal energization of said unit when the unit reaches the selected temperature level.

13. In an electrical heating device, an electric heating unit, means for energizing said unit, means including an adjustable thermostat for operating said unit at any one of a plurality of temperature levels, means for automatically increasing the energization of said unit to above normal in response to adjustment of said thermostat to substantially raise the operating temperature level of the unit, to cause said unit to heat rapidly to a selected temperature level determined by the adjustment of said thermostat, and means including a second thermostat for controlling said last means and for causing restoration of the normal energization of said unit when the unit reaches the selected temperature level.

14. In an electrical heating device, an electric heating unit, means for energizing said unit, an adjustable thermostatic switch comprising a pair of switches, having a common adjustable element and respective circuit breaking elements associated with said adjustable element, one of said switches being arranged to operate slightly in advance of the other, means connecting one of said switches in circuit with said unit, to permit operation of said unit under control of said switch at any selected temperature level determined by the adjustment of the switch, and means controlled by said other switch for increasing the energization of said unit to above normal, to cause said unit to heat rapidly to a selected temperature level under control of said other switch.

15. In an electrical heating device, an electric heating unit, means for energizing said unit, an adjustable thermostatic switch comprising a pair of switches having a common adjustable element and respective circuit breaking elements associated with said adjustable element, one of said switches being arranged to operate slightly in advance of the other, means connecting one of said switches in circuit with said unit, to permit operation of said unit under control of said switch at any selected temperature level determined by the adjustment of the switch, electrically-operable means for increasing the energization of said unit to above normal, and means connecting said other switch in an energizing circuit for said electrically-operable means, whereby said other switch controls the increased energization of said unit to cause the unit to heat rapidly to a selected temperature level.

16. In an electrical heating device, an electric heating unit, means for energizing said unit, means including an adjustable thermostat for operating said unit at any one of a plurality of temperature levels, means for increasing the energization of said unit to above normal, to cause said unit to heat rapidly to a selected temperature level determined by the adjustment of said thermostat, means including a second thermostat for controlling said last means and for causing restoration of the normal energization of said unit when the unit reaches the selected temperature level, and heating means common to both of said thermostats.

17. In an electrical heating device, an electric heating unit, means for energizing said unit, means including a multi-position control device for operating said unit at any one of a plurality of selected energy input levels corresponding respectively to selectable operating temperatures of the unit, means for automatically increasing the energization of said unit to above normal in response to adjustment of said control device to substantially raise the operating temperature level of the unit, whereby said unit is caused to heat rapidly, a thermo-motive element for controlling the operation of said last-named means, a plurality of heater elements for actuating said thermo-motive element, and means controlled by said control device for including different combinations of said heater elements to vary the operation of said thermo-motive element according to the energy input level selected.

18. In an electrical heating device, an electric heating unit comprising a plurality of sections, electrical circuit means for energizing said unit, switching means for connecting said sections either in series or parallel relation to vary the energization of said unit, a thermo-motive element for controlling the operation of said switching means, a plurality of heater elements for actuating said thermo-motive element, electrical connections for supplying heating currents to said heater elements, and switching means for varying the connections of said unit and for including different combinations of said heater elements, to vary the energy input level of said unit and to vary the actuation of said thermo-motive element accordingly.

JOSEPH W. MYERS.
STEPHEN J. ROESCH.